July 7, 1959     G. J. ANTLFINGER     2,893,908
NOVEL BARRIER LAYER IN LAMINATED STRUCTURE
Filed Aug. 27, 1956
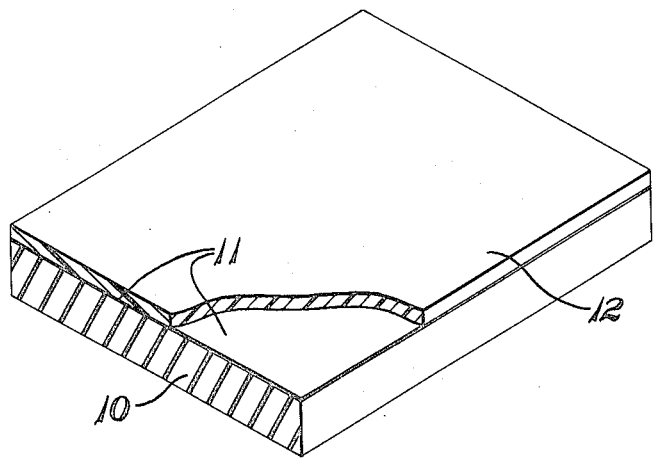
INVENTOR.
GEORGE J. ANTLFINGER
BY Jeston H. Powell, Jr.
ATTY.

2,893,908

NOVEL BARRIER LAYER IN LAMINATED STRUCTURE

George J. Antlfinger, Avon Lake, Ohio, assignor to The B. F. Goodrich Company, New York, N.Y., a corporation of New York Application August 27, 1956, Serial No. 606,290

6 Claims. (Cl. 154—139)

This invention relates to structures of at least one layer of a material containing migratory ingredients, one layer of a material subject to migration therein of said migratory ingredients and a barrier layer between said layers. The invention relates more particularly to laminated articles and structures having at least one lamina containing migratory plasticizing and/or staining materials, at least one other lamina previous to said migratory materials which it is desired to protect from said plasticizing and staining materials, and a barrier layer of a polymer of vinylidene cyanide interposed between said laminae to prevent migration of said staining and plasticizing materials from one lamina into another. The invention is particularly concerned with articles having an outer light colored lamina in close proximity to other laminae which normally or desirably contain migratory materials which would stain, discolor or otherwide deleteriously affect the light colored portion, and the prevention of such staining of said outer light colored lamina.

The manufacture of rubber, plastic and fabric articles having light colored laminae or portions in combination with laminae or portions containing migratory staining and plasticizing materials and the like has heretofore entailed serious production and use problems. Most rubbers such as natural rubber, rubbery copolymers of butadiene and styrene, butadiene and acrylonitrile, Butyl rubber, neoprene and similar rubbers generally contain and are previous to migratory materials. Light colored compositions of rubber or plastic are badly discolored by prolonged contact with compositions containing such staining and plasticizing materials because of the migration of such materials from one layer or lamina to another. A similar problem is encountered in the use of many other polymeric and plastic materials which contain compounding ingredients which are often staining materials, and plasticizers which migrate readily into previous laminae and often adversely affect outer and other laminae of composite structures. Staining of the outer or light colored lamina of laminated structures of compositions containing such materials is especially serious upon prolonged exposure to sunlight and heat.

For example, white and pastel rubber compositions and white and pastel vinyl polymer compositions are stained, and in the case of vinyl polymers, often degraded by migration therein of many of the common antioxidants normally used in rubber compositions as well as many of the common accelerators of vulcanization, softeners, oils, plasticizers and other common rubber compounding materials when in contact with rubber compositions. This problem is particularly acute when reclaim rubber, which is used on a wide scale in a variety of applications, is employed in structures since reclaim rubber contains many staining and migrating materials which discolor and deleteriously affect light colored laminae which are in adherent relation or otherwise in close proximity to reclaim rubber compositions.

Many attempts have been made to prevent staining of outer light colored laminae and layers of rubber and plastic laminated structures by variations in compounding and like techniques. Additionally various types of rubber barrier have been proposed. Neither technique has been completely successful in satisfactorily solving the problem. In many cases it is neither feasible nor desirable to compound all the layers of a laminated article so that no migratory material is included in any of the layers or lamina since to do so would necessitate sacrificing certain desirable physical properties imparted to the compositions by such migratory materials. Further, in the case of such base materials as reclaim rubber there are migratory materials present therein which are difficult or too costly to remove. In the case of many plastic materials, products of the reaction remain in the polymer product which are migratory; and in many cases plasticizers which are migratory in nature must be added to plastic polymers.

It is therefore an object of this invention to provide articles and structures wherein light colored compositions may be used in close proximity to compositions containing migratory materials in unitary constructions and to provide means for preventing the migration of staining, plasticizing and similar materials into the light colored compositions. It is also an object of the invention to provide unitary laminated constructions which are not necessarily light colored but which are designed to eliminate the passage of any migrating materials from one layer or lamina of the structure into another layer or lamina of the structure. Other objects will be apparent from the description of the invention which follows.

It is another object of the invention to provide a barrier layer on an article containing migratory materials, which article may be in intimate but temporary or non-unitary contact with an article faced with a material previous to said migratory materials as gaskets on opposing door faces. Conversely, the barrier layer may be placed on the article to be protected.

I have discovered that the foregoing objects may be attained by a construction in which an improved barrier layer impervious to migrating, staining, plasticizing and similar materials is interposed between a light colored or other layer which it is desired to protect from said migrating materials and another layer containing the migratory material. The barrier layer of this invention comprises a polymer of vinylidene cyanide. The use of this novel layer quite unexpectedly prevents contact migration of any of the normal compounding ingredients and constitutents of polymers, both rubbers and plastics, from one rubber or plastic composition to any other rubber or plastic composition.

The novel barrier layer of this invention comprises a polymer containing polymerized vinylidene cyanide, and the polymer may also contain lesser amounts of other vinylidene compounds which are polymerized with vinylidene cyanide. Vinylidene compounds contain the $H_2C=C<$ group, that is, a terminal methylene group attached by a double bond to a carbon atom. Examples of vinylidene compounds include those containing only one carbon-to-carbon unsaturated bond such as vinyl esters of aliphatic monocarboxylic acids as vinyl acetate; vinyl esters of aromatic monocarboxylic acids as vinyl benzoate; styrene and substituted styrenes; monoolefins such as isobutylene and propylene; acrylonitrile; vinyl chloride; vinylidene chloride; alkyl methacrylates such as methyl methacrylate; alkenyl esters of monobasic acids such as allyl chloride; isopropenyl esters such as isopropenyl acetate; halogenated monoolefins such as chloroprene; 1,2-dihaloethylenes such as dichloroethylene; alpha-substituted esters of acrylic acid such as methyl a-chloroacrylate; alkyl acrylates such as ethyl acrylate; alkyl vinyl ketones such as methyl vinyl ketone; unsaturated acids such as acrylic acid; difluorodichloroethylene and the like.

Other vinylidene compounds containing more than one unsaturated linkage which may be copolymerized with vinylidene cyanide include the conjugated dienes such as butadiene-1,3, isoprene, chlorobutadiene-1,3 and the like as well as interpolymers containing one or more each of vinylidene compounds containing only one carbon-to-carbon unsaturated bond and the conjugated dienes.

The defined copolymers desirably contain at least about 50 mol percent vinylidene cyanide and the polymer may contain as much as 100% vinylidene cyanide. However, better results are ordinarily obtained when a polymer containing about 50 mol percent vinylidene cyanide and about 50 mol percent of at least one other vinylidene compound such as vinyl acetate, methyl methacrylate, styrene and butadiene-1,3 are employed.

The vinylidene cyanide polymer may be employed in the construction of laminates and articles in the form of a film which is placed between the various laminae, a suitable cement being employed if desired. The polymer may also be applied as a cement to either one of the lamina, that is, the one to be protected from the migrating materials or to the lamina which contains the magrating materials. Useful cements or solutions of the vinylidene cyanide polymers may be made in such solvents as tetramethylurea; trialkyl phosphates which may be methyl, ethyl and propyl; acetonitrile; nitromethane; dimethyl sulfoxide; butyrolactone; dimethyl formamide and the like. The thickness of the barrier or buffer layer may be varied as desired or required but ordinarily is in excess of about .001 to .002 inch minimum thickness. All that is normally required is a continuous film which ordinarily is formed at about ¼ mil thickness. More useful barrier layers from about 1 to about 20 mils ordinarily will be used. Thicker layers may be used if desired, subject only to other requirements of the laminated structure.

A construction embodying this invention is illustrated in the accompanying drawing in which the single figure is an enlarged fragmentary sectional perspective view showing a portion of a floor mat embodying the invention, the outer portion being broken away for clarity of illustration. This construction includes a base portion 10 of reclaim rubber, the barrier layer 11 comprising a copolymer containing about 50 mol percent vinylidene cyanide and 50 mol percent vinyl acetate and a light colored outer protective layer 12 comprising a light colored plasticized vinyl chloride polymer film. In the construction of this article the base structure 10 of the floor mat is molded from a reclaim rubber composition, the top surface of this material is coated in any suitable manner with a 15% solution of a copolymer of vinylidene cyanide and vinyl acetate in dimethyl formamide. The structure is then dried for 10 minutes at 70° C. A top coat formulation is prepared from 100 weight parts of a water dispersion of polyvinyl chloride containing about 52% polyvinyl chloride, about 45 weight parts of a 60% dispersion of clay in water, about 5 weight parts of a 50% dispersion of titanox in water, about 70 weight parts of a 65% dispersion of diisooctyl phthalate in water, about one part of a 5% solution of a thickening agent and about 5 parts of a phthalocyanine blue pigment. This top coat formulation is sprayed onto the reclaim rubber base mats prepared as described above and the top coating fused by heating at 30 minutes at 158° F., and at 3 minutes at 212° F. For test purposes, a similar structure was prepared without the use of the barrier layer. For testing, these two articles are placed in an oven at 180° F. for 90 hours. At the end of this period the vinyl top coat 12 of the structure not containing the barrier layer is badly discolored and the outer vinyl film 12 is stiffened and cracks on flexing. In contrast thereto, the vinyl top coat 12 of the structure containing the barrier layer is not discolored and retains the original surface characteristics of the outer vinyl polymer layer 12. The migration of staining and other materials is prevented effectively by interposing the defined barrier layer between the laminae of the structure.

In another embodiment of the invention, arm rests, suitable for use in automobiles and furniture, are formed from reclaim rubber. The articles are then brush coated with a 15% solution of a copolymer of vinylidene cyanide and vinyl acetate in dimethyl formamide. Other arm rests are not so coated. A plasticized vinyl chloride polymer coated or calendered on fabric is then placed onto the coated base surface. On exposure of representative samples of both types of structures in the Fadeometer for 20 hours, and in an oven at 180° for 90 hours, those arm rests made with the vinylidene cyanide copolymer barrier layer showed evidence on the outer vinyl chloride polymer surface of bad discoloration and staining and degradation of surface. In the case of those structures containing the vinylidene cyanide copolymer barrier layer there is no evidence of discoloration of the top coat in either test and no apparent effect on the surface characteristics of the outer vinyl chloride polymer layer.

Similar light colored top layers such as those derived from other plasticized vinyl chloride polymers such as a polymer of a major porportion of vinyl chloride and a minor proportion of ethyl acrylate containing, for example, yellow iron oxide; vinylidene chloride and vinyl acetate polymers; and light colored rubber compositions such as those of GR-S, nitrile and chloroprene rubbers containing whiting and clay, similarly may be protected from migrating materials so as to provide light colored articles resistant to coloring and degradation caused by migrating materials when exposed to sunlight, heat and the like.

When the above and other articles and laminates are prepared with other of the defined vinylidene cyanide polymer barrier layers, and other polymers, similar excellent results are obtained. For example, the barrier layers of this invention may be employed effectively to prevent the passage of plasticizers such as dioctyl phthalate from a vinyl chloride polymer compound into another plastic or rubber compound in adjacent relation thereto.

Prior to this invention, choice of compounding ingredients was seriously limited in many laminated structures. But this invention provides means by which a base lamina and another lamina may be compounded as desired without problems resulting from migration of materials from one lamina to another. The invention is applicable to any laminated article or structure comprising a layer of a polymeric material containing migratory materials and another layer of polymeric or fabric material which it is desired to protect from the migration of undesirable constituents. The invention is also applicable to multilayer structures with two or more barrier layers to prevent migration of materials from one barrier or portion to another. Many applications of this invention will be apparent to those skilled in the art in such applications as crash pads, floor coverings, floor mats, arm rests, topper pads, upholstery material, scuff panels, tank linings, gaskets and the like employing foam, sponge, soft and hard rubber and plastic materials.

The vinylidene cyanide polymers may be compounded with suitable ingredients if desired; it being understood that no undesirable materials which might migrate into the other layers be employed.

Since it is apparent that there may be many variations and modifications effected within the spirit and scope of the invention it is intended that the invention be limited solely by the spirit and scope of the invention as defined in the appended claims.

I claim:

1. A composite structure comprising a base material containing migratory ingredients, an outer coating of a material subject to passage of said migratory materials therein and a barrier layer of a vinylidene cyanide polymer between said base and outer coating material.

2. An article of manufacture comprising a base polymeric material containing migratory ingredients, an outer polymeric material on at least one surface of said base material, which coating is pervious to said migratory materials and a barrier layer impervious to said migratory ingredients interposed between said base and outer coating comprising a polymer of vinylidene cyanide containing at least about 50 mol percent vinylidene cyanide.

3. An article of manufacture comprising a base rubber material containing migratory stain producing ingredients, an outer coating of a plastic material subject to staining and discoloration by said stain producing ingredients, and a barrier layer of a polymer containing at least about 50 mol percent vinylidene cyanide copolymerized with a lesser amount of a vinylidene compound interposed between said base and said outer coating preventing migration of said stain producing ingredients.

4. A structure comprising at least one layer of a material containing migratory ingredients and at least one layer of a material subject to migration of said migratory ingredients therein and a barrier layer of a polymer of vinylidene cyanide interposed between said layer containing migratory materials and said other layer.

5. An article of manufacture comprising a base material of reclaim rubber containing migratory ingredients and an outer coating of a plastic material comprising a polymer of vinyl chloride subject to staining by said stain producing ingredients and a barrier layer of a polymer containing about 50 mol percent vinylidene cyanide and about 50 mol percent vinyl acetate interposed between said base and outer coating preventing migration of said stain producing ingredients.

6. The method for preventing migration of migratory ingredients from a base material containing migratory ingredients and to an adjacent material pervious to said migratory ingredients which comprises interposing between said materials a barrier layer comprising a vinylidene cyanide polymer.

References Cited in the file of this patent

UNITED STATES PATENTS

| | | |
|---|---|---|
| 2,240,856 | Phillips | May 6, 1941 |
| 2,566,328 | Hessney et al. | Sept. 4, 1951 |
| 2,566,329 | Hessney et al. | Sept. 4, 1951 |
| 2,574,233 | Wolf | Nov. 6, 1951 |
| 2,700,997 | Morrissey et al. | Feb. 1, 1955 |
| 2,716,105 | Gilbert et al. | Aug. 23, 1955 |
| 2,731,060 | Rowe | Jan. 17, 1956 |
| 2,774,702 | Smith | Dec. 18, 1956 |
| 2,874,743 | Rowe | Feb. 24, 1959 |

UNITED STATES PATENT OFFICE

CERTIFICATE OF CORRECTION

Patent No. 2,893,908  July 7, 1959

George J. Antlfinger

It is hereby certified that error appears in the printed specification of the above numbered patent requiring correction and that the said Letters Patent should read as corrected below.

Column 1, lines 22, 42, and 50, and column 2, line 34, for "previous", each occurrence, read -- pervious --.

Signed and sealed this 3rd day of May 1960.

(SEAL)
Attest:

KARL H. AXLINE
Attesting Officer

ROBERT C. WATSON
Commissioner of Patents